(12) United States Patent
Kim et al.

(10) Patent No.: US 7,352,969 B2
(45) Date of Patent: Apr. 1, 2008

(54) FIBER OPTIC COMMUNICATION ASSEMBLY

(75) Inventors: Brian H. Kim, Fremont, CA (US); Darren S. Crews, Santa Clara, CA (US); Lee L. Xu, Cupertino, CA (US); Hengju H. Cheng, Mountain View, CA (US); An-chun Tien, San Jose, CA (US); Wei-zen Lo, Fremont, CA (US); William H. Wang, Pleasanton, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/955,809

(22) Filed: Sep. 30, 2004

(65) Prior Publication Data

US 2006/0067684 A1    Mar. 30, 2006

(51) Int. Cl.
*H04B 10/00* (2006.01)

(52) U.S. Cl. .................. 398/138; 398/139; 385/92

(58) Field of Classification Search ........ 398/135–139; 385/88–94
See application file for complete search history.

(56) References Cited

U.S. PATENT DOCUMENTS

| 5,708,743 | A | 1/1998 | Deandrea et al. | |
| 6,137,158 | A * | 10/2000 | Cohen et al. | 257/666 |
| 6,206,578 | B1 | 3/2001 | Shin et al. | |
| 2003/0138219 | A1 * | 7/2003 | O'Toole et al. | 385/92 |

FOREIGN PATENT DOCUMENTS

| DE | 199 10 164 A1 | 9/2000 |
| EP | 0 400 176 A | 12/1990 |
| EP | 1 048 965 A | 3/2001 |

OTHER PUBLICATIONS

PCT Search Report, mailed Apr. 13, 2006, PCT/US2005/034011.

* cited by examiner

*Primary Examiner*—Agustin Bello
(74) *Attorney, Agent, or Firm*—Blakely, Sokoloff, Taylor & Zafman LLP

(57) ABSTRACT

A transceiver is disclosed. The transceiver includes a carrier assembly having active components to transmit and receive optical input/output (I/O); and a connector, coupled to the carrier assembly to couple optical I/O between the active components and a waveguide.

17 Claims, 8 Drawing Sheets

FIBER OPTIC COMMUNICATION ASSEMBLY

FIELD OF THE INVENTION

The present invention relates to fiber optic communication; more particularly, the present invention relates to coupling radiant energy from an external waveguide into a waveguide on an integrated circuit.

BACKGROUND

More frequently, optical input/output (I/O) is being used in computer systems to transmit data between system components. Optical I/O is able to attain higher system bandwidth with lower electromagnetic interference than conventional I/O methods. In order to implement optical I/O, radiant energy is coupled from optical fibers on to an integrated circuit.

However, a problem occurs in aligning the optical fibers to active components on the integrated circuit. Particularly, the components typically are actively aligned by physically moving the fibers to find the maximum power before setting up for operation.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, a fiber optic communication mechanism is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
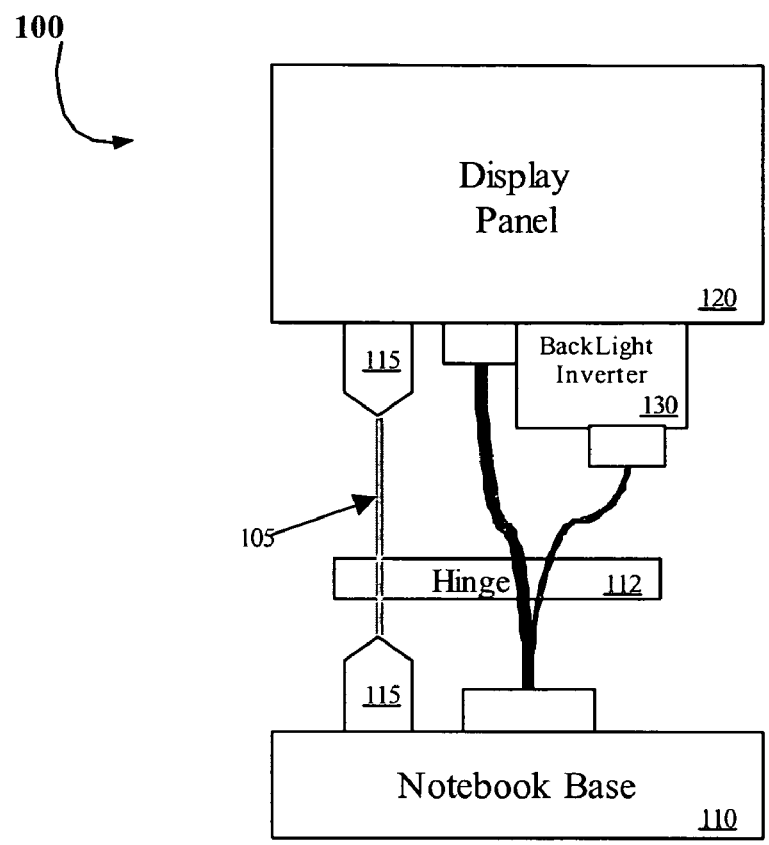
FIG. 1 illustrates one embodiment of a system.

FIG. 1 is a block diagram of one embodiment of a computer system 100. Computer system 100 is a notebook computer that includes a notebook base 110 attached to a display panel 120 via a hinge 112. System 100 also includes a back light inverter 130 coupled to display panel 120 for lighting display 120.

According to one embodiment, base 110 and display panel 120 are also coupled via a waveguide 105. Waveguide 105 transmits radiant energy between base 110 and display panel 120 via transceivers 115. Transceivers 115 are implemented to receive data from, and transmit data to, waveguide 105. In one embodiment, waveguide 105 is a fiber optic cable. However, other embodiments may feature other types of waveguides.

Figure 2:
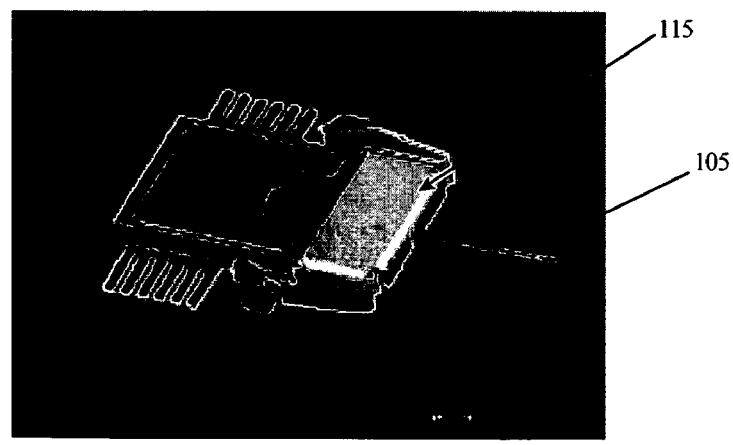
FIG. 2 illustrates one embodiment of a fiber optic transceiver.
Figure 3:
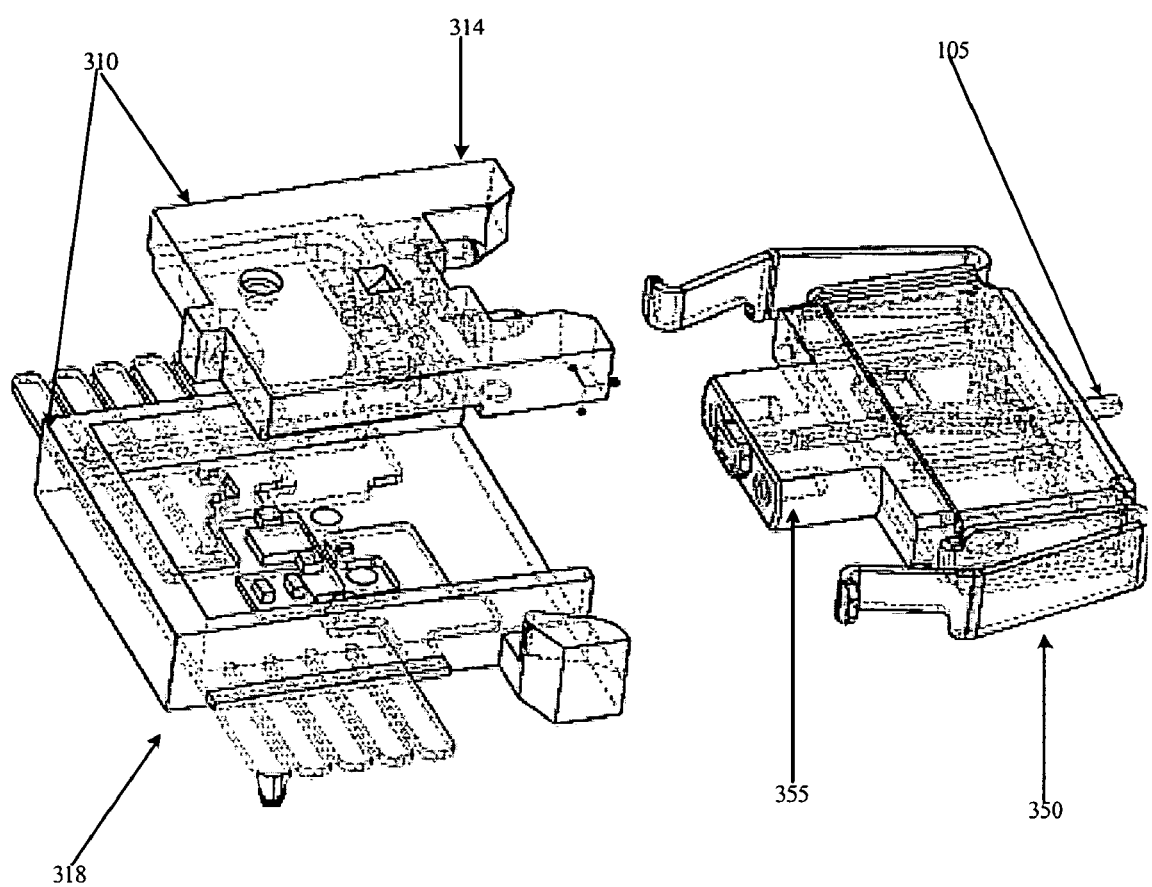
FIG. 3 illustrates an exploded view of one embodiment of a fiber optic transceiver.

FIG. 2 illustrates one embodiment of a transceiver 115 coupled to waveguide 105, while FIG. 3 illustrates an exploded view of transceiver 115. Transceiver 115 includes a carrier assembly 310 and a connector 350. Connector 350 includes a ferrule 355 that couples light to carrier assembly 310. Carrier assembly 310 includes an alignment frame 314 and a molded lead frame 318. Alignment frame 314 is implemented to align carrier assembly 310 with connector 350.

Figure 4:
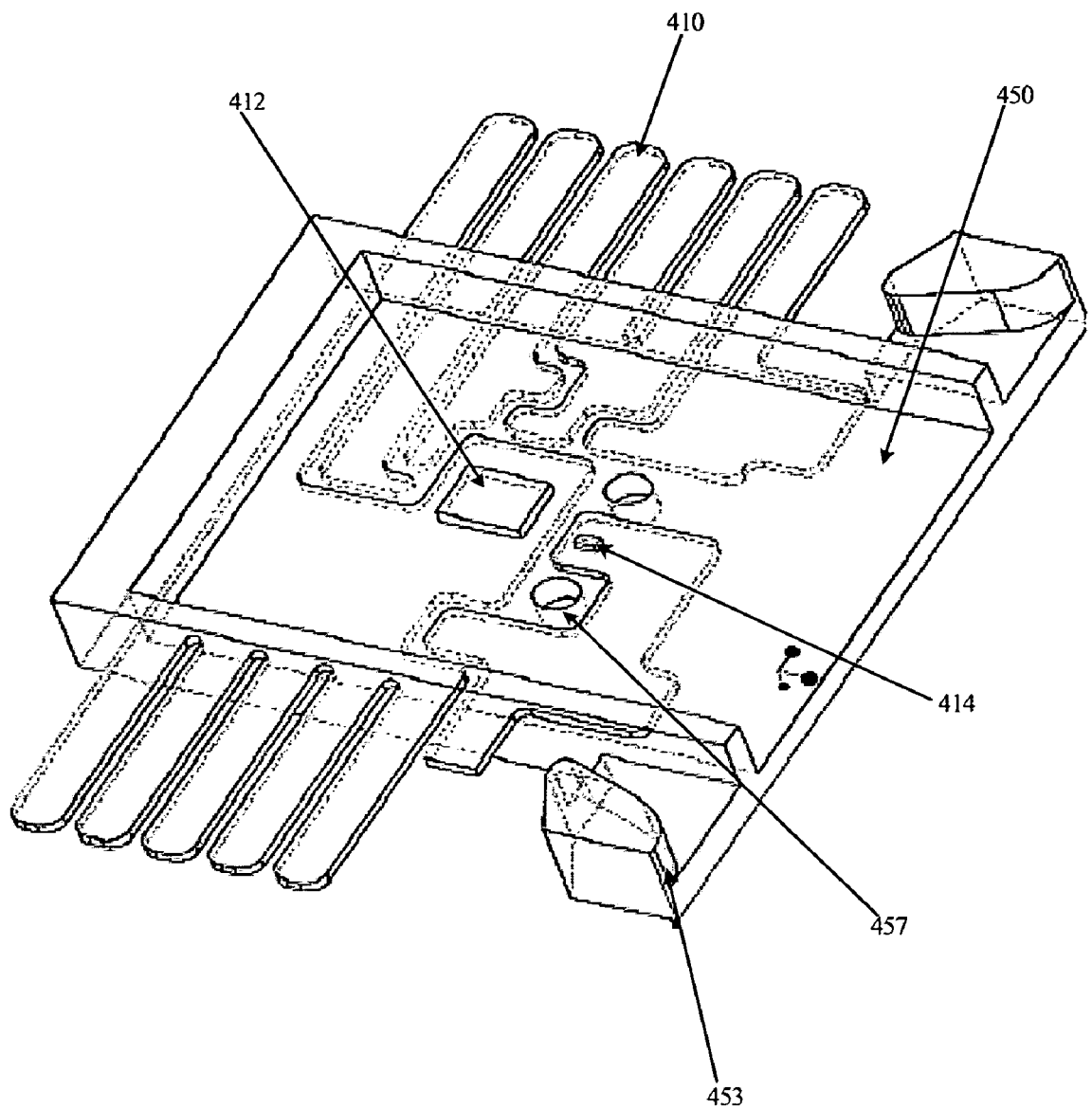
FIG. 4 illustrates one embodiment of a molded lead frame.

Molded lead frame 318 is coupled to a PCB, both physically and electrically, and includes the active devices that are used to transmit and receive data from waveguide 105 via connector 350. FIG. 4 illustrates one embodiment of molded lead frame 318. Molded lead frame 318 includes a metal lead frame 410 and a molded plastic component 450.

Lead frame 314 includes a trans-impedance amplifier (TIA) 412 and a photo detector 414. In one embodiment, TIA 412 is a vertical cavity surface emitting laser (VCSEL) that performs optical to electrical conversions. Photo detector 414 transforms light into a current. Subsequently, the current is transmitted to TIA 412 where it is amplified and converted to a digital signal.

Molded plastic component 450 serves as a mechanical housing for molded lead frame 314. Molded plastic component 450 includes a pair of latches 453 that are implemented to mate with connector 350. In addition, component 450 includes a set of precision holes 457 to interface with alignment frame 314. In particular, holes 457 are used a reference for die attaching. Holes 457 mate with lenses to perform optical alignment.

Figure 5:
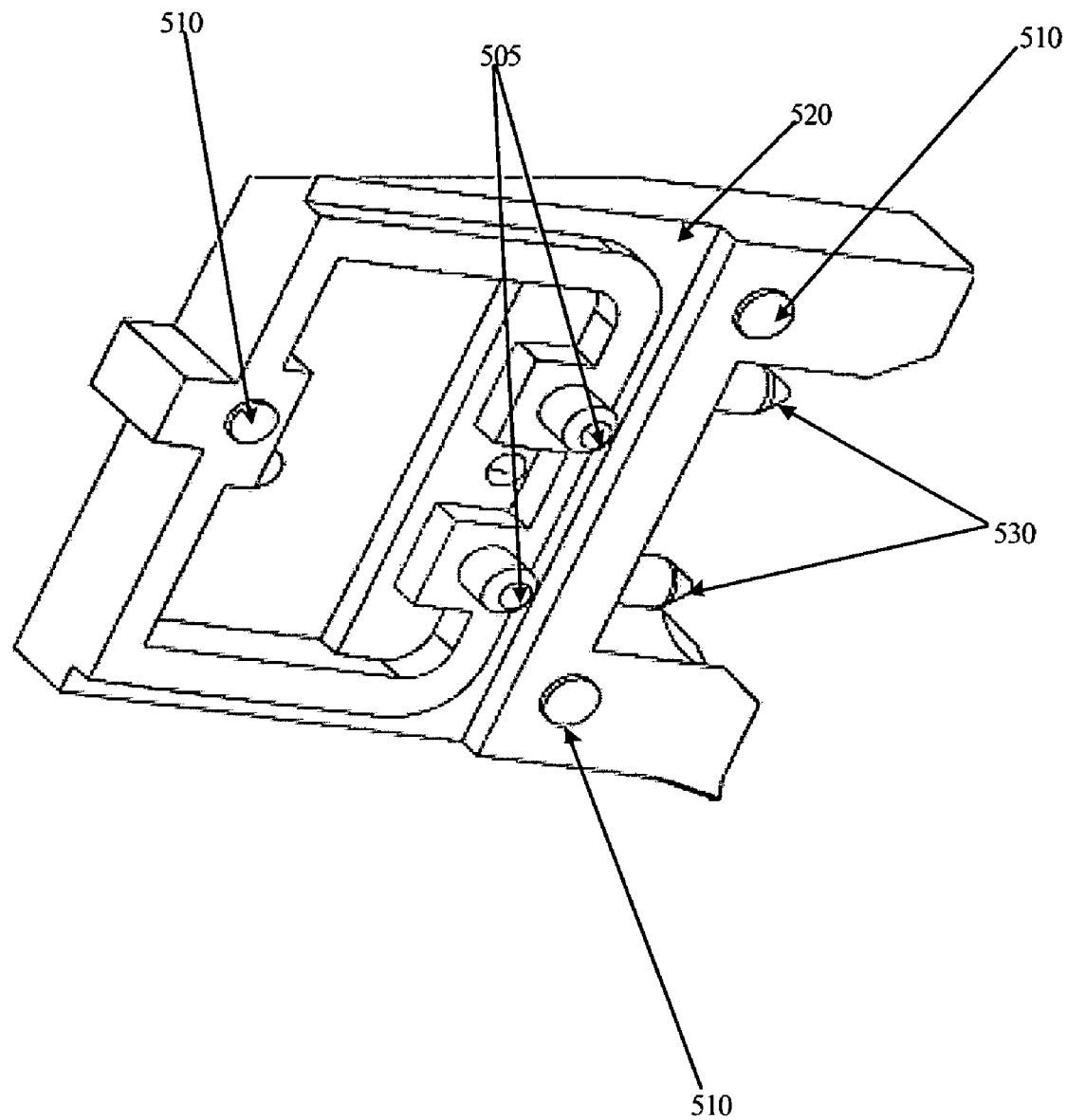
FIG. 5 illustrates one embodiment of an alignment frame.

FIG. 5 illustrates one embodiment of alignment frame 314. Alignment frame 314 includes guide pins 505 that are inserted within holes 457 of molded plastic component 450. Thus, the interface between holes 457 and guide pins 520 provides an interface between fibers of ferrule 355 and the photoactive components on molded lead frame 318.

In addition, alignment frame 314 includes alignment pins 510. Alignment pins 510 interfaces alignment frame 314 with metal lead frame 314. Particularly, alignment pins 510 serves as a reference feature that establishes a reference plane between alignment frame 314 and metal lead frame 314 to align the optics.

Alignment frame 314 also includes a channel 520 that is filled with sealing epoxy that seals alignment frame 314 to molded lead frame 318. Further, alignment frame 314 includes a set of guide pins 530 for interfacing the ferrule 355 optical fibers.

Figure 6:
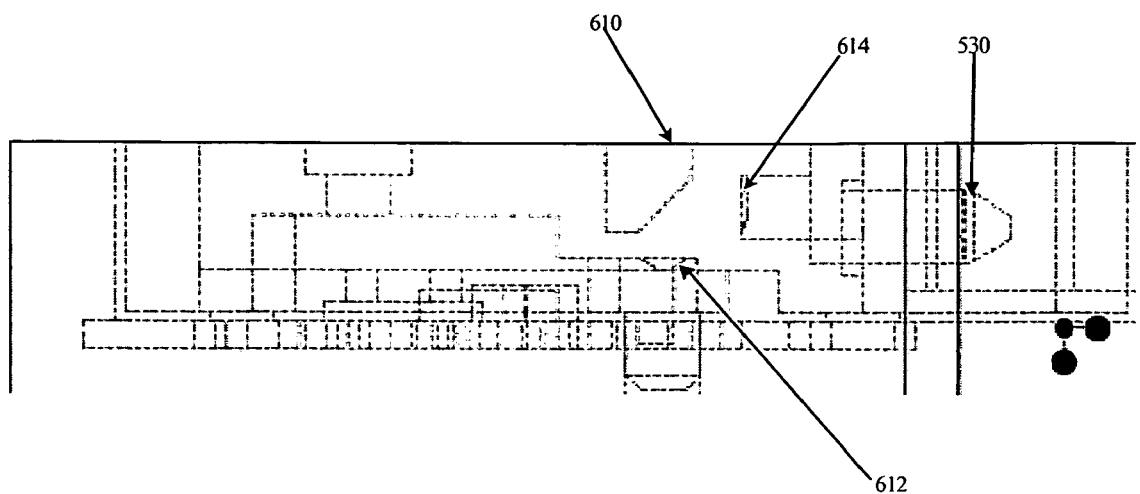
FIG. 6 illustrates a side view of one embodiment of an alignment frame.

FIG. 6 illustrates a side view of one embodiment of alignment frame 314. Alignment frame 614 includes mirror 610, and lenses 612 and 614. Lenses 612 and 614 transmit light between waveguide 105 and the active components of transceiver 115. Lens 612 couples light to molded lead frame 318, while lens 614 is coupled to guide pins 530 to couple light from connector 350. Mirror 610 is a 45° total internal reflection mirror that transmits light between lenses 612 and 614.

Figure 7:
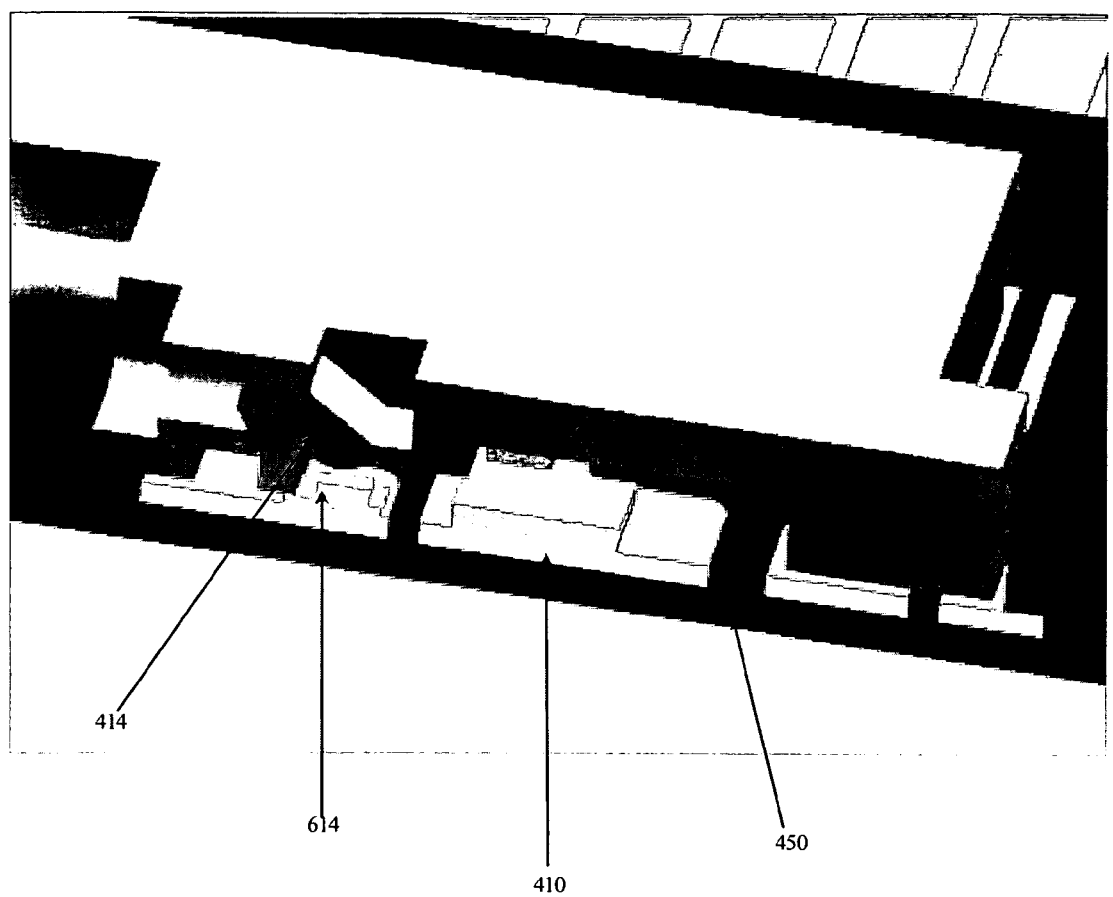
FIG. 7 illustrates a top view of one embodiment of a molded lead frame.

FIG. 7 illustrates a top view of one embodiment of molded lead frame 318. In this embodiment, metal lead frame 410 is mounted on a separate plane from molded plastic 450. However, there is a strong need to have a lower profile module for consumer products and mobile PC products. Such products are thinner and include low profile components.

Figure 8:
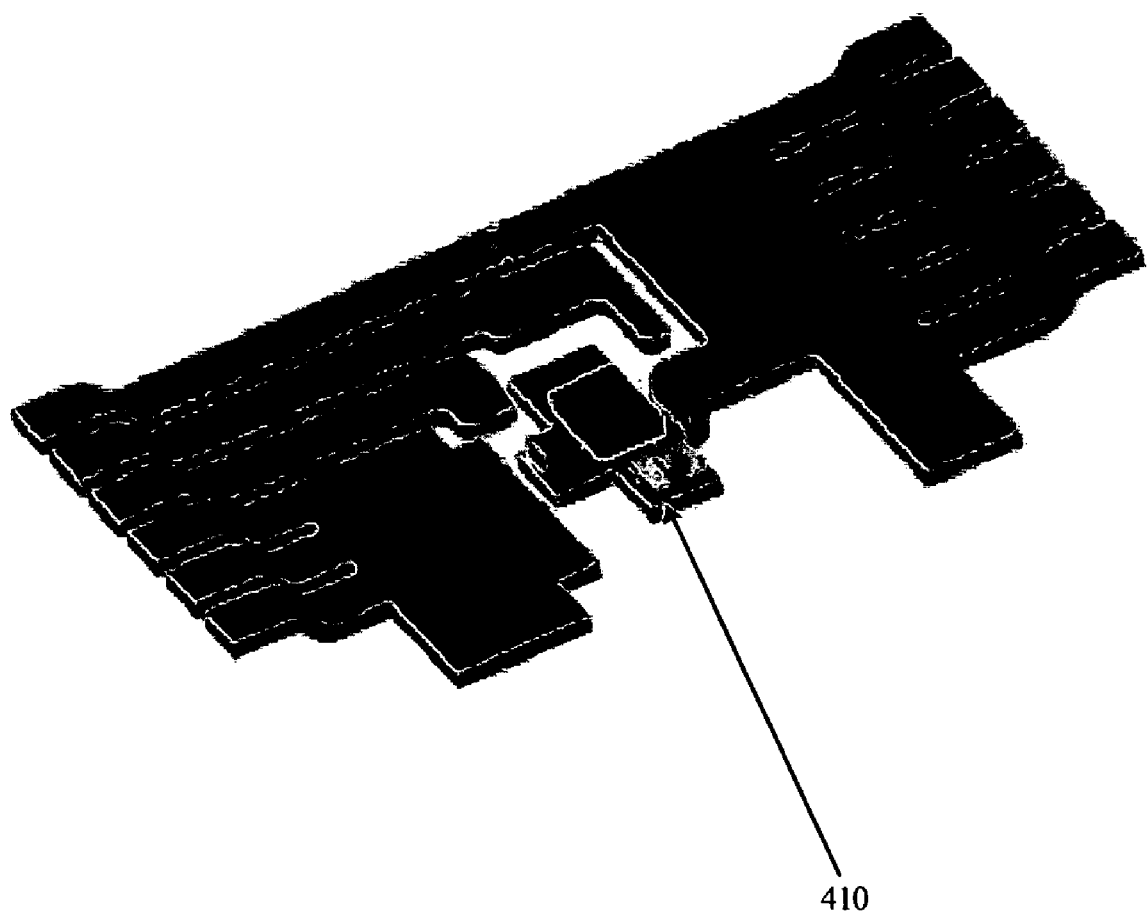
FIG. 8 illustrates one embodiment of a metal lead frame.

According to one embodiment, metal lead frame 410 is to use set down on a level flush with molded plastic 450. FIG. 8 illustrates one embodiment of a metal lead frame. In this embodiment, metal lead frame 410 is bent down to be flush with molded plastic 450. In addition, the photonic components are attached on the down set area of metal lead frame 410.

Figure 9:
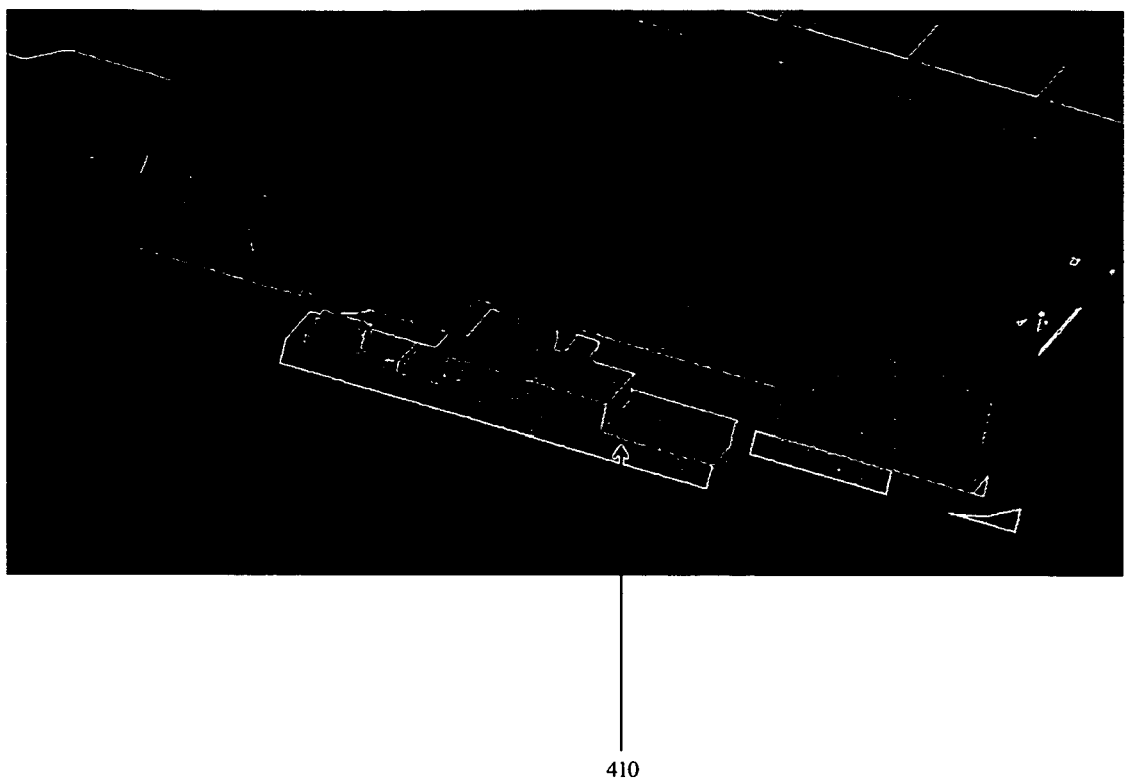
FIG. 9 illustrates a top view of another embodiment of a molded lead frame.

FIG. 9 illustrates a top view of one embodiment of molded lead frame 318 with the down set metal lead frame 410. Since the optical distance is fixed by the lens design, the lens can be mounted lower and overall package height becomes lower.

Although described above with respect to a notebook computer implementation, transceivers 115 may be used in various applications. For instance, system 100 includes printed circuit boards (PCBs). In one embodiment, transceivers 115 may couple two printed circuit boards (PCBs) to implement optical I/O.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A transceiver comprising:
   a carrier assembly having:
      a molded lead frame having:
         a metal lead frame component; and
         a molded plastic component;
      active components mounted on the molded lead frame to transmit and receive optical input/output (I/O); and
      an alignment frame having:
         alignment pins to directly interface with the metal lead frame component to establish a reference plane between the alignment frame and the metal lead frame; and
         guide pins to be inserted into the molded plastic component to operate as optical couplers; and
   a connector, coupled to the carrier assembly, to couple optical I/O between the active components and a waveguide.

2. The transceiver of claim 1 wherein the molded lead frame is coupled to a printed circuit board.

3. The transceiver of claim 1 wherein the molded lead frame comprises latches to couple the cater assembly to the connector.

4. The transceiver of claim 1 wherein the metal lead frame component is mounted on a separate plane from the molded plastic component.

5. The transceiver of claim 1 wherein the metal lead frame component is mounted on the same plane as the molded plastic component.

6. The transceiver of claim 1 wherein the molded lead frame comprises:
   a trans-impedance amplifier (TIA) to convert optical 110 signals; and
   a photo detector.

7. The transceiver of claim 6 wherein the TIA is a vertical cavity surface emitting laser (VCSEL).

8. The transceiver of claim 1 wherein the connector comprises a ferrule to couple the I/O between the active components and the waveguide.

9. The transceiver of claim 8 wherein the alignment frame aligns the carrier assembly with the connector.

10. The transceiver of claim 9 wherein the alignment frame comprises alignment pins to establish a reference plane between the alignment frame and the molded lead frame.

11. The transceiver of claim 9 wherein the molded plastic component comprises precision holes to receive the guide pins on the alignment frame in order to provide optical alignment.

12. The transceiver of claim 11 wherein the precision holes are implemented as a reference for die attaching.

13. The transceiver of claim 11 wherein the guide pins are inserted into the precision holes.

14. The transceiver of claim 13 wherein the interface between the guide pins and the precision holes provides an interface between the connector ferrule and the active components.

15. The transceiver of claim 13 wherein the alignment frame comprises a second guide pins that are inserted within the connector ferrule.

16. The transceiver of claim 15 wherein the alignment frame comprises:
   a first lens to couple optical I/O from the guide pins;
   a second lens to couple optical I/O from the second guide pins; and
   a mirror to coupled optical I/O between the first and second lenses.

17. The transceiver of claim 16 wherein the alignment frame comprises a channel filled with a sealing epoxy to seal the alignment between the alignment frame and the molded lead frame.

* * * * *

UNITED STATES PATENT AND TRADEMARK OFFICE
CERTIFICATE OF CORRECTION

PATENT NO. : 7,352,969 B2
APPLICATION NO. : 10/955809
DATED : April 1, 2008
INVENTOR(S) : Kim et al.

Page 1 of 1

It is certified that error appears in the above-identified patent and that said Letters Patent is hereby corrected as shown below:

In column 4, at line 14, delete "110" and insert --I/O--.

Signed and Sealed this

Eleventh Day of November, 2008

JON W. DUDAS
*Director of the United States Patent and Trademark Office*